(12) United States Patent
Izmailov et al.

(10) Patent No.: US 9,314,816 B2
(45) Date of Patent: Apr. 19, 2016

(54) METHODS OF MATERIAL HYDROPHILIZATION BY SILOXANES CONTAINING NITRILOPOLY (METHYLENEPHOSPHONIC ACID) OR DERIVATIVES THEREOF

(71) Applicant: SAMSUNG ELECTRONICS CO., LTD., Suwon-si, Gyeonggi-do (KR)

(72) Inventors: Boris Alexandrovich Izmailov, Moscow (RU); Elena Nikolaevna Rodlovskaya, Lyubertsy (RU); Galy Dmitrievna Markova, Moscow (RU); Oleg Valerievich Baranov, Moscow (RU); Valeri Alexandrovich Vasnev, Moscow (RU); Won-Cheol Jung, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 630 days.

(21) Appl. No.: 13/708,682

(22) Filed: Dec. 7, 2012

(65) Prior Publication Data

US 2013/0149544 A1 Jun. 13, 2013

(30) Foreign Application Priority Data

Dec. 7, 2011 (RU) .................................. 2011149714
Nov. 8, 2012 (KR) ......................... 10-2012-0126271

(51) Int. Cl.
*B05D 1/40* (2006.01)
*B05D 3/10* (2006.01)
(Continued)

(52) U.S. Cl.
CPC ........ *B05D 3/107* (2013.01); *B05D 5/08* (2013.01); *C09D 183/08* (2013.01);
(Continued)

(58) Field of Classification Search
CPC ........ B05D 3/107; B05D 5/08; C08G 77/045; C08G 77/26; C08G 77/30
See application file for complete search history.

(56) References Cited

U.S. PATENT DOCUMENTS 4,978,462 A   12/1990  Sheppard
5,332,767 A *  7/1994  Reisser .................. C08F 292/00
                                                   428/403

(Continued)

FOREIGN PATENT DOCUMENTS

DE         3932276 A1    3/1990
JP      1997-003629 A    1/1997

(Continued)

*Primary Examiner* — Dah-Wei D Yuan
*Assistant Examiner* — Kristen A Dagenais
(74) *Attorney, Agent, or Firm* — Cantor Colburn LLP

(57) ABSTRACT

A method of imparting hydrophilicity to a surface of a material, which comprises providing a base material comprising a surface; applying and chemically fixing a siloxane oligomer represented by Chemical Formula 1 to the surface of the base material to form a siloxane-modified surface; and applying a phosphonic acid compound represented by Chemical Formula 2 to the siloxane-modified surface and carrying out a reaction therebetween to form an organosiloxane coating:

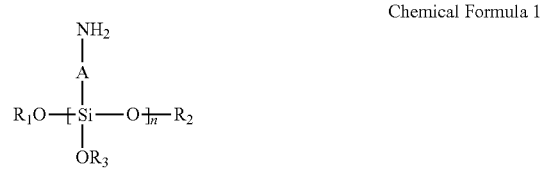

Chemical Formula 1 wherein in Chemical Formula 1,
$R_1$, $R_2$, and $R_3$ are the same or different, and are each independently hydrogen or a C1 to C3 alkyl group,
A is a single bond or a C1 to C5 alkylene group, and
n ranges from 2 to 30;

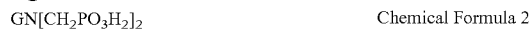

Chemical Formula 2 wherein in Chemical Formula 2,
G is —$CH_2PO_3H_2$, a group represented by Chemical Formula 3, or a group represented by Chemical Formula 4 as defined herein.

10 Claims, 1 Drawing Sheet

(51) Int. Cl.
 *B05D 3/04* (2006.01)
 *B05D 5/08* (2006.01)
 *C09D 183/08* (2006.01)
 *C08G 77/04* (2006.01)
 *C08G 77/26* (2006.01)
 *C08G 77/30* (2006.01)

(52) U.S. Cl.
 CPC ............ *C08G 77/045* (2013.01); *C08G 77/26* (2013.01); *C08G 77/30* (2013.01); *Y10T 428/31612* (2015.04); *Y10T 428/31663* (2015.04)

(56) References Cited

U.S. PATENT DOCUMENTS

| | | | |
|---|---|---|---|
| 5,705,665 A | 1/1998 | Ichinohe et al. | |
| 6,015,398 A * | 1/2000 | Arimatsu | A61M 5/32 604/265 |
| 2005/0037274 A1* | 2/2005 | Shida | G03G 5/144 430/60 |
| 2012/0045586 A1* | 2/2012 | Hoffmann | C09D 143/04 427/407.1 |
| 2013/0177768 A1* | 7/2013 | Kruger | C09D 5/084 428/412 |
| 2013/0340616 A1* | 12/2013 | Iyer | C10L 3/08 95/186 |

FOREIGN PATENT DOCUMENTS

| | | |
|---|---|---|
| JP | 1997-165393 A | 6/1997 |
| JP | 2005-290361 A | 10/2005 |
| KR | 100149054 B1 | 6/1998 |
| KR | 1020110083742 A | 7/2011 |
| RU | 2370583 C2 | 10/2009 |

* cited by examiner

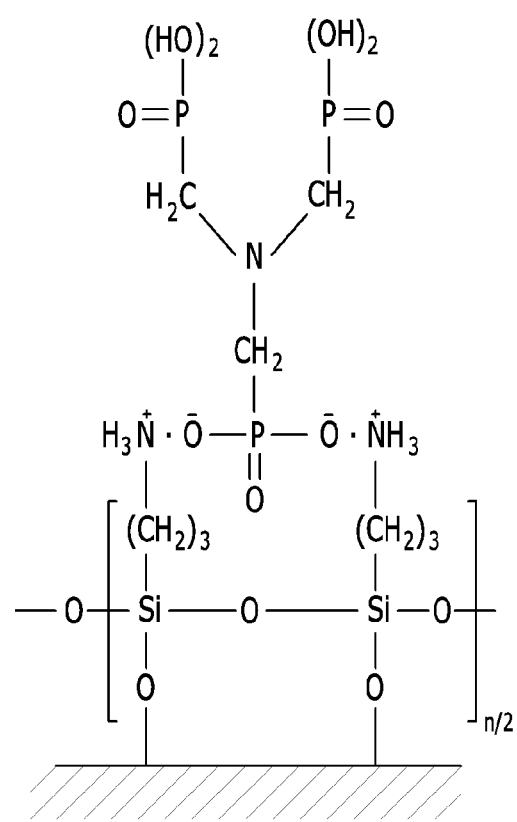

METHODS OF MATERIAL HYDROPHILIZATION BY SILOXANES CONTAINING NITRILOPOLY (METHYLENEPHOSPHONIC ACID) OR DERIVATIVES THEREOF

CROSS-REFERENCE TO RELATED APPLICATION

This application claims priorities to and the benefits of Russian Patent Application No. 2011149714, filed on Dec. 7, 2011 and Korean Patent Application No. 10-2012-0126271, filed on Nov. 8, 2012, and all the benefits accruing therefrom under 35 U.S.C. §119, the contents of which in their entirety are herein incorporated by reference.

BACKGROUND

1. Field

A method of manufacturing modified materials is disclosed. The method may be used for imparting hydrophilic surface properties to various materials.

2. Description of the Related Art

DE 3,932,276 discloses a method of hydrophilic processing of textile material with a composition containing a mixture of polyorganosiloxane and polydiorganosiloxane. The polyorganosiloxane as used possesses hydrophilic properties, but is a water-insoluble compound. To increase its emulsifying ability in the processing of fibrous materials, another polyorganosiloxane, i.e., a polydiorganosiloxane is added, which serves the function of a surfactant. The disadvantage of this method is the instability of the emulsion, for example, its tendency of the emulsion to coagulate, caused by the properties of the applied polyorganosiloxanes.

Another method of providing a textile material made of various fibers with hydrophilic properties is disclosed in Russian Patent No. 2370583 entitled "Method of providing fibrous materials with hydrophilic properties by means of oxyalkylenorganosiloxane block copolymers". However, this method uses oxyalkylenorganosiloxane in quantities of 1-5% by weight of the fibrous material. Thus, there remains a need for a material with enhanced hydrophilic properties.

The above information disclosed in this Background section is only for enhancement of understanding of the background of the invention and therefore it may contain information that does not form the prior art that is already known in this country to a person of ordinary skill in the art.

SUMMARY

An embodiment provides a method of imparting hydrophilic properties to a surface of various base materials.

Another embodiment provides an article including a hydrophilically-modified surface made by the aforementioned method.

According to an embodiment, the method of imparting hydrophilicity to a surface of a material includes providing a base material having a surface; and applying and chemically fixing a siloxane oligomer represented by Chemical Formula 1 to the surface of the base material to form a siloxane-modified surface; and applying a phosphonic acid compound represented by Chemical Formula 2 to the siloxane-modified surface and carrying out a reaction therebetween to form an organosiloxane coating:

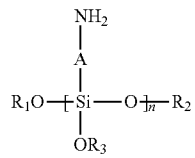

Chemical Formula 1 wherein in Chemical Formula 1, $R_1$, $R_2$, and $R_3$ are the same or different, and are each independently hydrogen or a C1 to C3 alkyl group, A is a single bond or a C1 to C5 alkylene group, and n ranges from 2 to 30;

$$GN[CH_2PO_3H_2]_2$$ Chemical Formula 2 wherein in Chemical Formula 2,

G is —$CH_2PO_3H_2$, a group represented by Chemical Formula 3, or a group represented by Chemical Formula 4:

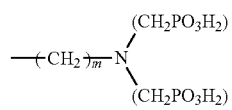

Chemical Formula 3 wherein in Chemical Formula 3, m is an integer ranging from 2 to 8; and

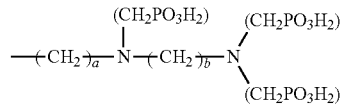

Chemical Formula 4 wherein in Chemical Formula 4, a and b are the same or different and are each independently integers ranging from 2 to 6.

The base material may include an organic material, an inorganic material, or an organic-inorganic hybrid material, and may have a hydroxyl group, a carboxyl group, or a combination thereof on the surface thereof.

The base material may be subjected to a corona treatment, an ultraviolet (UV) treatment, a plasma treatment, or a chemical treatment using hydrogen peroxide, hexafluoride isopropanol, or an acid so that the surface of the base material may have a hydroxyl group, a carboxyl group, or a combination thereof on its surface before applying and chemically fixing the siloxane oligomer represented by Chemical Formula 1 to the surface of the base material.

The siloxane oligomer represented by Chemical Formula 1 may be oligo(aminopropyl)ethoxysilane, oligo(aminopropyl)methoxysilane, oligo(aminoethyl)methoxysilane, oligo(aminoethyl)ethoxysilane, oligo(aminobutyl)ethoxysilane, oligo(aminobutyl)methoxysilane, oligo(aminopentyl)ethoxysilane, oligo(aminopentyl)methoxysilane, or a combination thereof.

In Chemical Formula 1 of the siloxane oligomer, "n" may range from 4 to 16.

The phosphonic acid compound represented by Chemical Formula 2 may be nitrilotri(methylenephosphonic acid), ethylenebis(nitrilodimethylene)tetraphosphonic acid, hexamethylenediamine-N,N,N',N'-tetrakis(methylphosphonic acid), diethylenetriaminepentakis(methylphosphonic acid) a derivative of the foregoing phosphonic acid compounds, or a combination thereof.

Applying and chemically fixing the siloxane oligomer to the surface of the base material may include wetting the surface of the base material with a solution containing the siloxane oligomer to provide a wetted surface, and drying, heating, or drying and heating the wetted surface.

The solution containing the siloxane oligomer may be prepared by dissolving the siloxane oligomer represented by Chemical Formula 1 in a C1 to C10 alcohol in an amount of about 0.05 to about 10 wt % based on a total weight of the solution.

Applying the phosphonic acid compound to the siloxane modified surface and carrying out the reaction therebetween may include wetting the siloxane modified surface with a solution containing the phosphonic acid compound to provide a wetted surface, and drying, heating, or drying and heating the wetted surface.

The solution containing the phosphonic acid compound may be prepared by dissolving the phosphonic acid compound represented by Chemical Formula 2 in a C1 to C10 alcohol in an amount of about 1 to about 30 wt % based on a total weight of the solution.

According to other embodiments, an article having a hydrophilically-modified surface includes a base material and an organosiloxane coating chemically fixed on a surface of the base material, wherein the coating includes a reaction product of a siloxane oligomer represented by Chemical Formula 1 or a polysiloxane derived therefrom, with a phosphonic acid compound represented by Chemical Formula 2:

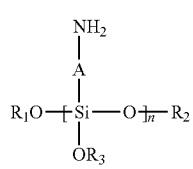

Chemical Formula 1 wherein in Chemical Formula 1,
$R_1$, $R_2$, and $R_3$ are the same or different, and are each independently hydrogen or a C1 to C3 alkyl group,
A is a single bond or a C1 to C5 alkylene group, and
n ranges from 2 to 30;

Chemical Formula 2 wherein in Chemical Formula 2,
G is —$CH_2PO_3H_2$, a group represented by Chemical Formula 3, or a group represented by Chemical Formula 4:

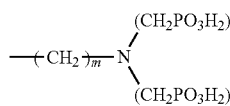

Chemical Formula 3 wherein in Chemical Formula 3,
m is an integer ranging from 2 to 8; and

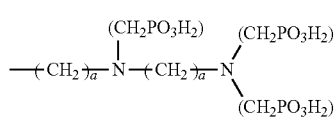

Chemical Formula 4 wherein in Chemical Formula 4,
a and b are the same or different and are each independently integers ranging from 2 to 6.

The base material may include an organic material, an inorganic material, or an organic-inorganic hybrid material, and may have a hydroxyl group, a carboxyl group, or a combination thereof on the surface.

The base material may include a polymer, leather, wood, a metal, a metal oxide, a metal nitride, a ceramic material, glass, or a combination thereof.

The siloxane oligomer represented by Chemical Formula 1 may be oligo(aminopropyl)ethoxysilane, oligo(aminopropyl)methoxysilane, oligo(aminoethyl)methoxysilane, oligo (aminoethyl)ethoxysilane, oligo(aminobutyl)ethoxysilane, oligo(aminobutyl)methoxysilane, oligo(aminopentyl)ethoxysilane, oligo(aminopentyl)methoxysilane, or a combination thereof.

The phosphonic acid compound represented by Chemical Formula 2 may include nitrilotri(methylenephosphonic acid), ethylenebis(nitrilodimethylene)tetraphosphonic acid, hexamethylenediamine-N,N,N',N'-tetrakis(methylphosphonic acid), diethylenetriaminepentakis(methylphosphonic acid) a derivative of the foregoing phosphonic acid compounds, or a combination thereof.

The infrared spectroscopy spectrum of the coating may display bands for a P=O bond, a P—OH bond, a Si—O—Si bond, a Si—O—C bond, and a Si—C bond.

The surface of the article may have a water contact angle of about 15° or less.

The article may be an interior or exterior part of a home appliance, an anti-fogging glass, or a glass for use in a vehicle.

BRIEF DESCRIPTION OF THE DRAWINGS

The above and other aspects, advantages and features of this disclosure will become more apparent by describing in further detail exemplary embodiments thereof with reference to the accompanying drawing, in which:

FIG. 1 schematically shows a chemical structure of a coating formed on a material surface in accordance with an embodiment.

DETAILED DESCRIPTION

This disclosure will be described more fully hereinafter with reference to the accompanying drawings, in which various embodiments are shown. This disclosure may, however, be embodied in many different forms and is not to be construed as limited to the exemplary embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "combination thereof" means that a combination comprising at least one of the listed elements is present, optionally together with a like element not listed.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkyl" as used herein means a monovalent group derived from a straight or branched chain saturated aliphatic hydrocarbon having the specified number of carbon atoms.

"Alkylene" as used herein means a divalent group derived from a straight or branched chain saturated aliphatic hydrocarbon having the specified number of carbon atoms.

"Hydroxyalkyl" as used herein means an alkyl group wherein at least one hydrogen is replaced with a hydroxyl group.

"Substituted" as used herein refers to replacing at least one hydrogen with a C1 to C3 alkyl group, a hydroxyl group, a cyano group, a nitro group, a sulfhydriyl group, a halogen (e.g., Cl, Br, I, or F), or a combination thereof, provided that the valence of the atom is not exceeded. In an embodiment, the substituent is a C1 to C3 alkyl group, a hydroxyl group, or a combination thereof.

In an embodiment, the method of imparting hydrophilicity to a surface of a material includes providing a base material having a surface; applying and chemically fixing a siloxane oligomer represented by Chemical Formula 1 to the surface of the base material to form a siloxane-modified surface; and applying and chemically fixing a phosphonic acid compound represented by Chemical Formula 2 to the siloxane-modified surface, i.e., carrying out a reaction therebetween to form an organosiloxane coating on the surface:

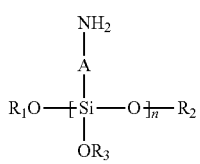

Chemical Formula 1 wherein in Chemical Formula 1,
R$_1$, R$_2$, R$_3$, A, and n are the same as defined above;

Chemical Formula 2 wherein in Chemical Formula 2,
G is the same as defined above.

The base material may have a hydroxyl group, a carboxyl group, or a combination thereof on its surface. The base material may include an organic material, an inorganic material, or an organic-inorganic hybrid material. Specifically, the base material may include various polymers such as polyester, polyethylene, polypropylene, polycarbonate, or polyvinylchloride, a natural material such as wood or leather, a glass, a metal, a metal oxide or nitride such as SiO$_2$, TiO$_2$, SnO$_2$, ZnO$_2$, Fe$_2$O$_3$, Al$_2$O$_3$, or AAO (anodic aluminum oxide), or a ceramic material, but is not limited thereto. The base material may have any shape such as a fiber, a film, a plate, a sphere, a cube, a cuboid, and a polyhedron, or an irregular shape, but is not limited thereto. The base material may be subjected to a surface treatment so that the surface of the base material has a hydroxyl group, a carboxyl group, or a combination thereof. Non-limiting examples of the surface treatment may include a corona treatment, an ultraviolet (UV) treatment, a plasma treatment, or a chemical treatment using hydrogen peroxide, hexafluoride isopropanol, or an acid such as concentrated or dilute sulfuric acid.

In one embodiment, the method imparts hydrophilicity to a surface of various materials by forming an organosiloxane coating comprising a reaction product of a siloxane oligomer represented by Chemical Formula 1 or a polysiloxane derived therefrom with a phosphonic acid compound represented by Chemical Formula 2, for example, an nitrilopoly(methylenephosphonic acid) or a derivative thereof via molecular assembling on a surface of the material. The method may first include applying and chemically fixing the siloxane oligomer represented by Chemical Formula 1 on the surface of the base material to provide a siloxane-modified surface. The method may further include applying and chemically fixing the phosphonic acid compound represented by Chemical Formula 2 to the siloxane-modified surface to form the organosiloxane coating.

Specific examples of the siloxane oligomer represented by Chemical Formula 1 include oligo(aminopropyl)ethoxysilane, oligo(aminopropyl)methoxysilane, oligo(aminoethyl)methoxysilane, oligo(aminoethyl)ethoxysilane, oligo(aminobutyl)ethoxysilane, oligo(aminobutyl)methoxysilane, oligo(aminopentyl)ethoxysilane, and oligo(aminopentyl)methoxysilane, but are not limited thereto. A combination comprising at least one of the foregoing siloxane oligomers may be used. For example, the siloxane oligomer may be oligo(aminopropyl)ethoxysilane represented by Chemical Formula 1a.

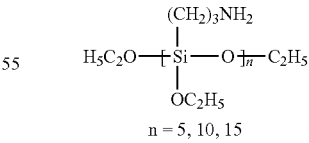

Chemical Formula 1a n = 5, 10, 15

Specific examples of the phosphonic acid compound represented by Chemical Formula 2 include nitrilotri(methylenephosphonic acid), ethylenebis(nitrilodimethylene)tetraphosphonic acid, hexamethylenediamine-N,N,N',N'-tetrakis(methylphosphonic acid), diethylenetriaminepentakis(methylphosphonic acid), and derivatives thereof, but are not limited thereto. A combination comprising at least one of the foregoing phosphonic acid compounds may be used. For example, the phosphonic acid compound may be nitrilotri (methylenephosphonic acid) represented by Chemical Formula 2a.

 Chemical Formula 2a

In the aforementioned method, the siloxane-modified surface is prepared by applying the siloxane oligomer represented by Chemical Formula 1, such as oligo(aminopropyl) ethoxysilane, to the material surface and chemically fixing the same to the material surface (see, for example, Reaction Scheme 1).

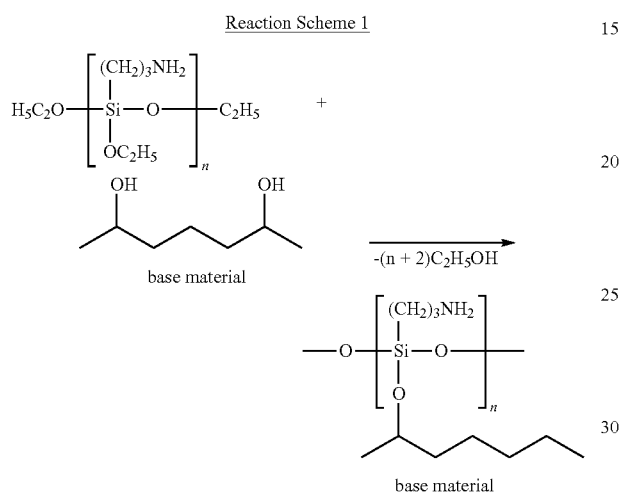

The chemical fixing of the siloxane oligomer may involve dissolving the siloxane oligomer in an appropriate solvent, e.g., a C1 to C10 alcohol to prepare a siloxane oligomer solution and wetting (e.g., soaking) the surface of the base material with the siloxane oligomer solution to provide a wetted surface, followed by drying and/or heating the wetted surface, for example in the air, or in an oven. The siloxane oligomer represented Chemical Formula 1 may have an appropriate solubility in order to uniformly modify (e.g., coat) the surface of the base material with siloxane moieties. Drying and/or heating may enable the siloxane oligomer represented by Chemical Formula 1 to be chemically fixed (reacted) on the surface of the base material.

The siloxane oligomer having a desired value of "n" may be prepared by reacting a proper amount of trialkoxy silane compound having an aminoalkyl group in the presence of an appropriate amount of water.

The concentration of the siloxane oligomer solution is not particularly limited and may range from about 0.05 to about 10 wt %, specifically from about 0.1 to about 1 wt %, based on a total weight of the solution. The temperature of drying and/or heating in the air is not particularly limited and it may be room temperature (or about 20° C.) or higher, specifically a temperature of about 30° C. to 150° C. In addition, the time for drying and/or heating is not particularly limited, and it may be from about 5 minutes to about 24 hours.

Due to a condensation reaction of an alkoxy group of the oligomer with a reactive functional group (e.g., a hydroxyl group) on the surface of material, the siloxane oligomer of Chemical Formula 1 is covalently fixed on the surface of the base material, thus forming a micro- or nano-coating containing the siloxane oligomer of Chemical Formula 1, or a polysiloxane derived therefrom (see, Reaction Scheme 1).

The weight of the organosiloxane coating formed on the surface of the material after wetting, drying and/or heat treatment may be estimated by an increase in the weight of the material, which may be expressed as a percentage of the initial weight of the material. If after single wetting, drying and heat treatment the material gain does not reach the desired values, then additional wetting, drying and heat treatments of the material are performed until the required weight gain is reached. The coatings thus formed may have a micrometer (e.g., 1 to 100 micrometer) or nanometer (e.g., 1 to 999 nanometer) thickness as desired for the particular application.

Next, the phosphonic acid compound represented by Chemical Formula 2 may be used to further modify the siloxane-modified surface. Specifically, the siloxane-modified surface may be wetted with a solution containing the phosphonic acid compound, and then dried, heated, or dried and heated, for example, in the air or in an oven. By way of an example, when nitrilotri(methylene phosphonic acid) is used as the phosphonic acid compound of Chemical Formula 2, it may trigger a condensation reaction of aminopropyl containing organosiloxane coating fixed on the surface of the base material with nitrilotri(methylene phosphonic acid) at heating. As a result, nitrilotri(methylene phosphonic acid) may react with the amino groups of organosiloxane coating fixed on the surface of the base material to form hydrophilic groups thereon (see, for example. Reaction Scheme 2).

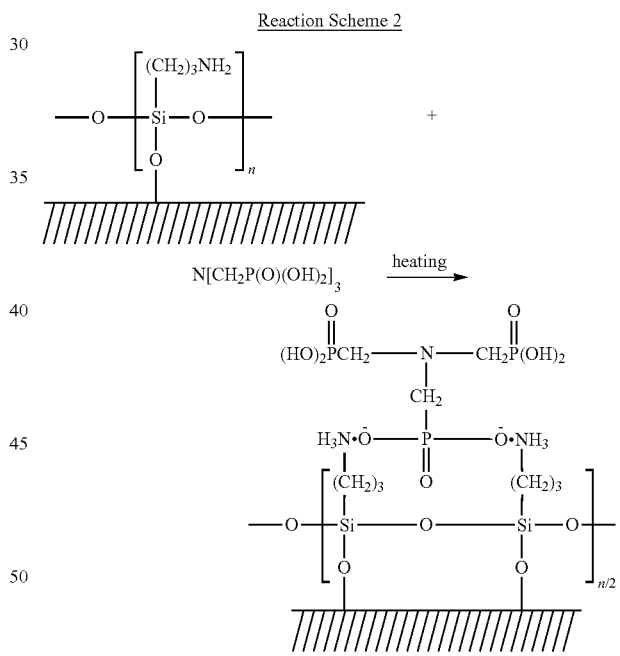

The concentration of the solution of phosphonic acid compound represented by formula 2, for example, nitrilotri(methylene phosphonic acid) solution is not particularly limited and may be properly selected. By way of an example, the concentration of the nitrilotri(methylene phosphonic acid) solution may range from about 1 to about 30 wt % based on a total weight of the solution, but is not limited thereto. The temperature of drying and/or heating, for example, in the air is not particularly limited and it may be room temperature (or 20° C.) or higher, specifically a temperature of about 30° C. to about 150° C. In addition, the time for drying and/or heating is not particularly limited, and for example, it may be from about 5 minutes to about 24 hours.

By the aforementioned method, the surface may be modified by a coating layer of a "brush geometry" as illustrated in FIG. 1.

The presence in the coatings of hydrophilic (water-soluble) groups may give hydrophilicity to the material surface.

In a specific embodiment, without being bound by theory, the mechanism of the formation of hydrophilic organosiloxane coatings on the surface of silicate glass can be based on the interaction of reactive hydrophilic alkoxysilyl (e.g., ethoxy silyl) groups of the siloxane oligomer (e.g., oligo(aminopropyl)ethoxysiloxane (I-III) as described in the examples) with silanolic groups present on the surface of silicate glass (see, for example, Reaction Scheme 3).

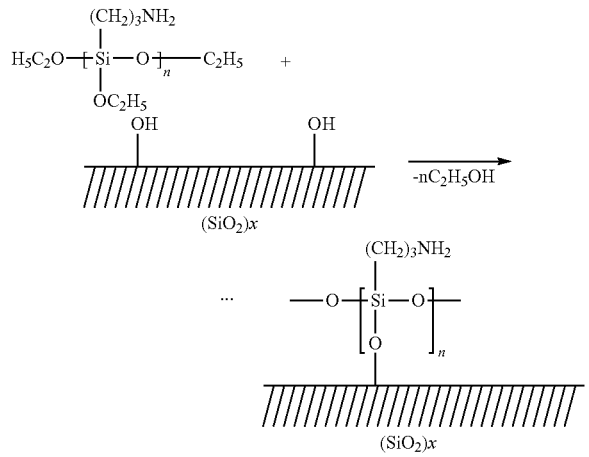

Reaction Scheme 3

In Reaction Scheme 3, ethanol may be separated and removed during the drying and/or the heat treatment of the material, specifically the heat treatment of the material.

Again without being bound by theory, the mechanism of the formation of hydrophilic organosiloxane coatings on the surface of silicate glass can be based on the interaction of aminopropyl containing coatings fixed on the surface, for example, the product of Reaction Scheme 3 with nitrilotri(methylphosphonic acid) (see, for example, Reaction Scheme 2), leading to the chemical bonding of the hydrophilic nitrilotri(methylphosphonic) groups with the aminopropylic groups on the surface of the organosiloxane coating.

In another specific embodiment, without being bound by theory, the mechanism of the formation of hydrophilic organosiloxane coatings on the surface of a polyester film can be based on the interaction of reactive hydrophilic ethoxy groups of oligo(aminopropyl)ethoxysiloxane (e.g., oligo(aminopropyl)ethoxysiloxane (I-III) as described in the examples) with the terminal carboxyl (—COOH) and hydroxyl (—OH) groups, located on the surface of a polyester film (see, for example, Reaction Scheme 4).

Reaction Scheme 4

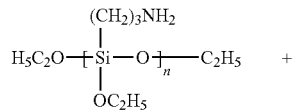

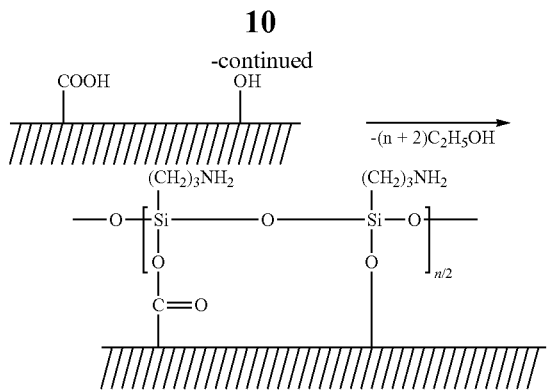

In Reaction Scheme 4, ethanol may be separated and removed by the drying and/or heat treatment, specifically heat treatment.

Again without being bound by theory, the mechanism of the formation of hydrophilic organosiloxane coatings on a polyester film can be further based on the interaction of the amino group of the siloxane oligomer represented by Chemical Formula 1 or the polysiloxane derived therefrom, for example, the product of Reaction Scheme 4, with the phosphonic acid compound of Chemical Formula 2 (e.g., nitrilotri(methylphosphonic acid)) (see, for example, Reaction Scheme 2), leading to the bonding of the hydrophilic nitrilotri(methylphosphonic) groups on the siloxane modified surface of the base material.

In other embodiments, an article having a hydrophilically-modified surface includes a base material and an organosiloxane coating chemically fixed, for example formed, on a surface of the base material, wherein the organosiloxane coating includes a reaction product of a siloxane oligomer represented by Chemical Formula 1 or a polysiloxane derived therefrom, with a phosphonic acid compound represented by Chemical Formula 2, and wherein the siloxane oligomer or the polysiloxane derived therefrom is chemically fixed on the surface of the base material.

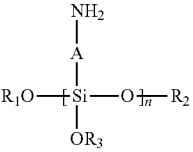

Chemical Formula 1

In Chemical Formula 1, $R_1$, $R_2$, $R_3$, A, and n are the same as defined above.

$$GN[CH_2PO_3H_2]_2 \qquad \text{Chemical Formula 2}$$

In Chemical Formula 2, G is the same as defined above.

In the aforementioned article, the base material, the siloxane oligomer, the phosphonic acid compound represented by Chemical Formula 2, and the formation of the reaction product therebetween are the same as set forth above.

As used herein, the term "chemically fixing" means a linking through a bond (e.g., an ionic bond, a covalent bond, etc.) that is formed by interaction between compounds.

The infrared spectroscopy spectrum of the coating may display vibrational bands for a P=O bond, a P—OH bond, a Si—O—Si bond, a Si—O—C bond, and a Si—C bond. The organosiloxane coating may further include a vibrational band for a C(=O)O bond. The IR-spectra of the modified samples of materials contain bands of valent vibrations for P=OH bonds in 2700-2600 cm$^{-1}$ range, for P—OH bonds in the field of 1040-1180 cm$^{-1}$ range, for Si—O—Si bonds in 1080-1020 cm$^{-1}$ range, for Si—OC bonds in the region of 880-810 cm$^{-1}$ and deformation vibrations of Si—C bonds in the range of 1260 and 800 cm$^{-1}$, which is consistent with the formation of the organosiloxane coating.

The article includes a coating formed on the base material and thereby has a hydrophilically modified surface, and the surface of the coating has a water contact angle of about 15° or less. Such a low level of water contact angle has an effect of preventing dew condensation phenomenon at the surface of the article. Therefore, the article may find its utility in various applications requiring the prevention of the dew condensation. By way of a non-limiting example, the article may be interior or exterior parts for various appliances such as a refrigerator, an air conditioner, and a humidifier, or an anti-fogging glass or a glass for vehicles.

Hereinafter, the embodiments are illustrated in more detail with reference to examples. However, the following are exemplary embodiments and therefore are not limiting.

EXAMPLES

Example 1

The surface of a silicate glass is wetted with an ethanolic or aqueous solution of a siloxane oligomer (I) represented by the following chemical formula having a concentration of 0.1% and 1% respectively, dried in the air and heat-treated at a temperature of 140° C. to fix the siloxane oligomer on the surface of the glass.

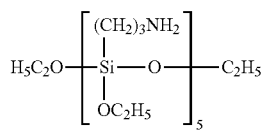
(I)

The silicate glass having the siloxane-modified surface is soaked with a 10 ethanolic solution of nitrilotri(methylene phosphonic acid), dried in the air, and heat-treated at a temperature of 140° C. The water contact angle is determined on tensiometer "Tracker IT Concept" (France) in two minutes (in static conditions) after a water drop was putt on the surface of the base material.

Example 2

The silicate glass is treated in the same manner as set forth in Example 1, except that 0.1% and 1% solutions of the siloxane oligomer (II) represented by the following chemical formula are used:

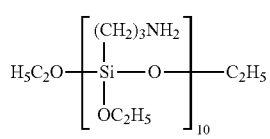
(II)

The water contact angle as compiled in Table 1 confirms an increase in hydrophilicity of the silicate glass.

Example 3

The silicate glass is treated in the same manner as set forth in Example 1, except that 0.1% and 1% solutions of the siloxane oligomer (III) represented by the following chemical formula are used:

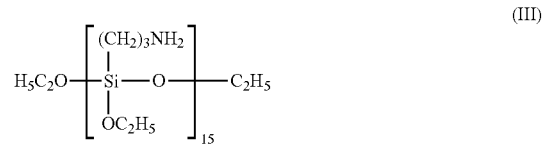
(III)

The water contact angle as compiled in Table 1 confirms an increase in hydrophilicity of the silicate glass.

Example 4

A base material is treated in the same manner as set forth in Example 1, except that a polyester film is used as the base material. The water contact angle as compiled in Table 1 confirms an increase in hydrophilicity of the polyester film.

Example 5

A base material is treated in the same manner as set forth in Example 1, except that a polyester film is used as the base material and 0.1% and 1% solutions of the siloxane oligomer (II) represented by the following chemical formula are used:

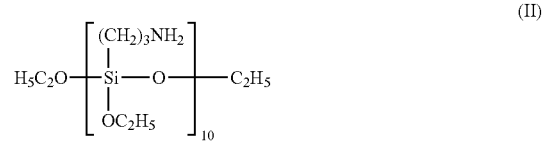
(II)

The water contact angle as compiled in Table 1 confirms an increase in hydrophilicity of the polyester film.

Example 6

A base material is treated in the same manner as set forth in Example 1, except that a polyester film is used as the base material and 0.1% and 1% solutions of the siloxane oligomer (III) represented by the following chemical formula are used:

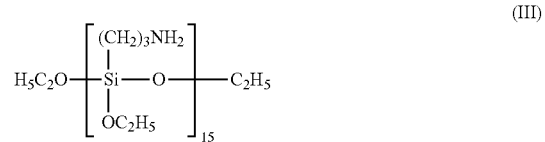
(III)

The water contact angle as compiled in Table 1 confirms an increase in hydrophilicity of the polyester film.

TABLE 1

Contact angel of wetting the surface of materials, modified by organosiloxane coatings, containing the hydrophilic nitrilotri(methylphosphonic) groups

| Material | Oligomer | Concentration of oligomer solution, % | Area of the modified surface, S, cm$^2$ | Weight of organosiloxane coating on the material surface | | | | Weight of nitrilotri(methylphosphonic acid) | | | | Contact angel, degree |
|---|---|---|---|---|---|---|---|---|---|---|---|---|
| | | | | g | mmole | g/cm$^2$ | mmole/cm$^2$ | mmole | G | mmole/cm$^2$ | g/cm$^2$ | |
| Silicate glass | I | 0.1 | 6 | 0.1 | 0.9 | 0.017 | 0.15 | 0.9 | 0.27 | 0.15 | 0.04 | 3 |
| | | 1 | | 1 | 9.07 | 0.17 | 1.51 | 9.07 | 2.71 | 1.51 | 0.45 | 3 |
| | II | 0.1 | | 0.1 | 0.9 | 0.017 | 0.15 | 0.9 | 0.27 | 0.15 | 0.04 | 3 |
| | | 1 | | 1 | 9.07 | 0.17 | 1.51 | 9.07 | 2.71 | 1.51 | 0.45 | 3 |
| | III | 0.1 | | 0.1 | 0.9 | 0.017 | 0.15 | 0.9 | 0.27 | 0.15 | 0.04 | |
| | | 1 | | 1 | 9.07 | 0.17 | 1.51 | 9.07 | 2.71 | 1.51 | 0.45 | 3 |
| Polyester film | I | 0.1 | 18 | 0.1 | 0.9 | 0.0055 | 0.05 | 0.9 | 0.27 | 0.05 | 0.015 | 12 |
| | | 1 | | 1 | 9.07 | 0.055 | 0.50 | 9.07 | 2.71 | 0.51 | 0.15 | 12 |
| | II | 0.1 | | 0.1 | 0.9 | 0.0055 | 0.05 | 0.9 | 0.27 | 0.05 | 0.015 | 12 |
| | | 1 | | 1 | 9.07 | 0.055 | 0.50 | 9.07 | 2.71 | 0.51 | 0.15 | 12 |
| | III | 0.1 | | 0.1 | 0.9 | 0.0055 | 0.05 | 0.9 | 0.27 | 0.05 | 0.015 | 12 |
| | | 1 | | 1 | 9.07 | 0.055 | 0.50 | 9.07 | 2.71 | 0.51 | 0.15 | 12 |
| Silicate glass | None | | | | | | | | | | | 46 |
| Polyester film | None | | | | | | | | | | | 43 |

An analysis of the data in Table 1 indicates that the disclosed methods are effective to impart high hydrophilic properties to the surface of various materials. For example, the contact angle of the material surface decreases about 3.6-15.3 times when an oligo(aminopropyl)ethoxysiloxane (I-III) is loaded at an amount of from about 0.1 to about 1% by weight as compared to the contact angle of an untreated surface of the same base material.

Thus, the disclosed method allows for a significant increase of the hydrophilicity of the surface of various materials (silicate glass, polyester films) (about 3.6-15.3 times) while at the same time requires a minimal amount of siloxane loading (siloxane oligomer or a polysiloxane derived therefrom).

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of imparting hydrophilicity to a surface of a material, which comprises:
providing a base material comprising a surface;
applying and chemically fixing a siloxane oligomer represented by Chemical Formula 1 to the surface of the base material to form a siloxane-modified surface; and
applying a phosphonic acid compound represented by Chemical Formula 2 to the siloxane-modified surface and carrying out a reaction therebetween to form an organosiloxane coating:

Chemical Formula 1

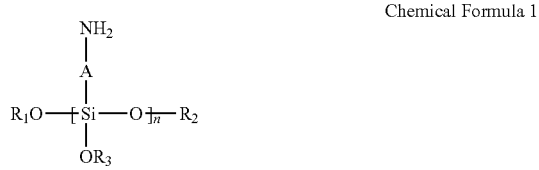

wherein in Chemical Formula 1,
R$_1$, R$_2$, and R$_3$ are the same or different, and are each independently hydrogen or a C1 to C3 alkyl group,
A is a single bond or a C1 to C5 alkylene group, and
n ranges from 2 to 30;

$$GN[CH_2PO_3H_2]_2$$

Chemical Formula 2 wherein in Chemical Formula 2,
G is —CH$_2$PO$_3$H$_2$, a group represented by Chemical Formula 3, or a group represented by Chemical Formula 4:

Chemical Formula 3

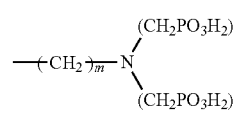

wherein in Chemical Formula 3,
m is an integer ranging from 2 to 8; and

Chemical Formula 4

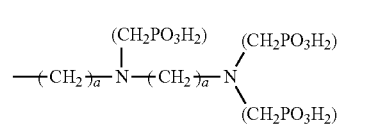

wherein in Chemical Formula 4,
a and b are the same or different and are each independently integers ranging from 2 to 6.

2. The method of claim 1, wherein the base material is an organic material, an inorganic material, or an organic-inorganic hybrid material, and comprises a hydroxyl group, a carboxyl group, or a combination thereof on the surface thereof.

3. The method of claim 2, further comprising subjecting the base material to a corona treatment, an ultraviolet (UV) treatment, a plasma treatment, or a chemical treatment using hydrogen peroxide, hexafluoride isopropanol, or an acid to have a hydroxyl group, a carboxyl group, or a combination thereof on its surface before applying and chemically fixing the siloxane oligomer represented by Chemical Formula 1 to the surface of the base material.

4. The method of claim 1, wherein the siloxane oligomer represented by Chemical Formula 1 is oligo(aminopropyl)ethoxysilane, oligo(aminopropyl)methoxysilane, oligo(aminoethyl)methoxysilane, oligo(aminoethyl)ethoxysilane, oligo(aminobutyl)ethoxysilane, oligo(aminobutyl)methoxysilane, oligo(aminopentyl)ethoxysilane, oligo(aminopentyl)methoxysilane, or a combination thereof.

5. The method of claim 1, wherein the siloxane oligomer represented by Chemical Formula 1 has an n value ranging from 4 to 16.

6. The method of claim 1, wherein the phosphonic acid compound represented by Chemical Formula 2 is nitrilotri(methylenephosphonic acid), ethylenebis(nitrilodimethylene)tetraphosphonic acid, hexamethylenediamine-N,N,N',N'-tetrakis(methylphosphonic acid), diethylenetriaminepentakis(methylphosphonic acid) a derivative of the foregoing phosphonic acid compounds, or a combination thereof.

7. The method of claim 1, wherein the applying and chemically fixing the siloxane oligomer to the surface of the base material comprises wetting the surface of the base material with a solution comprising the siloxane oligomer to provided a wetted surface, and drying, heating, or drying and heating the wetted surface.

8. The method of claim 7, wherein preparing the solution comprising the siloxane oligomer comprises dissolving the siloxane oligomer represented by Chemical Formula 1 in a C1 to C10 alcohol in an amount of about 0.05 to about 10 wt % based on a total weight of the solution.

9. The method of claim 8, wherein the applying the phosphonic acid compound to the siloxane modified surface and carrying out the reaction therebetween comprises wetting the siloxane modified surface with a solution comprising the phosphonic acid compound to provide a wetted surface, and drying, heating, or drying and heating the wetted surface.

10. The method of claim 9, wherein preparing the solution comprising the phosphonic acid compound comprises dissolving the phosphonic acid compound represented by Chemical Formula 2 in a C1 to C10 alcohol in an amount of about 1 to about 30 wt % based on a total weight of the solution.

* * * * *